(12) United States Patent
Tanaka et al.

(10) Patent No.: US 8,758,595 B2
(45) Date of Patent: Jun. 24, 2014

(54) PROCESS OIL, PROCESS FOR PRODUCTION OF DEASPHALTED OIL, PROCESS FOR PRODUCTION OF EXTRACT, AND PROCESS FOR PRODUCTION OF PROCESS OIL

(75) Inventors: Meishi Tanaka, Ichihara (JP); Masashi Nakamura, Ichihara (JP); Kazuhiro Teshima, Ichihara (JP); Akihito Abe, Ichihara (JP); Masami Takasaki, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 333 days.

(21) Appl. No.: 13/095,936

(22) Filed: Apr. 28, 2011

(65) Prior Publication Data

US 2011/0198264 A1 Aug. 18, 2011

Related U.S. Application Data

(62) Division of application No. 11/913,124, filed as application No. PCT/JP2006/310692 on May 29, 2006, now Pat. No. 7,972,496.

(30) Foreign Application Priority Data

May 31, 2005 (JP) ................................ 2005-160582
Sep. 21, 2005 (JP) ................................ 2005-274689

(51) Int. Cl.
*C10G 21/00* (2006.01)
*C10M 105/06* (2006.01)

(52) U.S. Cl.
USPC .......... 208/19; 208/14; 585/1; 585/2; 585/24; 585/833

(58) Field of Classification Search
USPC ............................................. 208/14, 19, 309
See application file for complete search history.

(56) References Cited

U.S. PATENT DOCUMENTS 5,504,135 A 4/1996 Ardrizz et al.
5,840,175 A * 11/1998 Aldous et al. .................. 208/87

(Continued)

FOREIGN PATENT DOCUMENTS

CN 1564858 A 1/2005
EP 1 031 621 A2 8/2000

(Continued)

OTHER PUBLICATIONS

Office Action issued Aug. 30, 2011 in China Application No. 2006800190156 (With English Translation).

(Continued)

*Primary Examiner* — Ellen McAvoy
(74) *Attorney, Agent, or Firm* — Oblon, Spivak, McClelland, Maier & Neustadt, L.L.P.

(57) ABSTRACT

The present invention is related to a process oil using as a raw material a deasphalted oil obtained by deasphalting a vacuum residual oil of a crude oil and a manufacturing method of the process oil, the process oil having properties of:
(a) a polycyclic aromatics (PCA) content of less than 3 mass %;
(b) a viscosity (100° C.) of 40 to 70 mm$^2$/s;
(c) an aniline point of 85 to 100° C.;
(d) a flash point of 250° C. or higher;
(e) an aromatic hydrocarbon content of 40 to 55 mass %; and
(f) a polar substance content of 10 to 15 mass %.

The present invention is also related to a process oil and a manufacturing method of the process oil, the process oil obtained by mixing: an extract obtained by deasphalting and solvent-extracting a vacuum residual oil of a crude oil; and a lubricant base oil having a polycyclic aromatics (PCA) content of less than 3 mass %, and having properties of:
(a) a polycyclic aromatics (PCA) content of less than 3 mass %; (i) a viscosity (100° C.) of 30 to 80 mm$^2$/s;
(j) an aniline point of 90° C. or lower;
(k) a flash point of 240° C. or higher;
(l) a benzo(a)pyrene content of 1 mass ppm or less;
(m) a specified aromatic compound content of 10 mass ppm or less; and
(n) a polar substance content of 10 to 30 mass %.

4 Claims, 3 Drawing Sheets

(56) References Cited

U.S. PATENT DOCUMENTS

| | | | |
|---|---|---|---|
| 5,976,361 A * | 11/1999 | Hood et al. | 208/309 |
| 6,103,808 A | 8/2000 | Hashimoto | |
| 6,248,929 B1 * | 6/2001 | Kaimai et al. | 585/241 |
| 6,399,697 B1 * | 6/2002 | Takasaki et al. | 524/575 |
| 6,410,816 B2 | 6/2002 | Takasaki et al. | |
| 6,605,695 B2 * | 8/2003 | Takasaki et al. | 528/2 |
| 6,878,263 B2 * | 4/2005 | Kaimai et al. | 208/14 |
| 7,186,876 B2 * | 3/2007 | Manton et al. | 585/833 |
| 7,601,253 B2 * | 10/2009 | Kaimai et al. | 208/19 |
| 7,972,496 B2 * | 7/2011 | Tanaka et al. | 208/19 |
| 2001/0007049 A1 | 7/2001 | Takasaki et al. | |
| 2001/0023307 A1 | 9/2001 | Kaimai et al. | |
| 2001/0045377 A1 * | 11/2001 | Morishima et al. | 208/309 |
| 2002/0188054 A1 | 12/2002 | Takasaki et al. | |

FOREIGN PATENT DOCUMENTS

| | | |
|---|---|---|
| JP | 6-505524 | 6/1994 |
| JP | 11-080434 | 3/1999 |
| JP | 11-080751 | 3/1999 |
| JP | 2948659 | 7/1999 |
| JP | 11-302456 | 11/1999 |
| JP | 2000-63849 | 2/2000 |
| JP | 2000-80208 | 3/2000 |
| JP | 2000-248119 | 9/2000 |
| JP | 2000-309786 | 11/2000 |
| JP | 2002-3861 | 1/2002 |
| JP | 2003-213040 | 7/2003 |
| WO | WO 92/14779 | 9/1992 |
| WO | 97/35462 | 10/1997 |
| WO | 03/031537 | 4/2003 |

OTHER PUBLICATIONS

"Sekiyu Binnran", Nippon Oil Corporation, Sekiyu-shunju, Dec. 31, 1982, pp. 263-265.

Office Action issued May 31, 2013 in Korean Patent Application No. 10-2007-7030824 (with English language translation).

Office Action issued on Aug. 16, 2011 in the corresponding Japanese Patent Application No. 2005-274689 (with English Translation).

"Report on the proposal for a directive of the European Parliament and of the Council relating to restrictions on the marketing and use of certain polycyclic aromatic hydrocarbons in extender oils and tyres (twenty-seventh amendment of Council Directive 76/769/EEC)", Committee on the Environment, Public Health and Food Safety, Apr. 25, 2005, 15 pages.

"Proposal for a Directive of the European Parliament and of the Council relating to restrictions on the marketing and use of certain polycyclic aromatic hydrocarbones in extender oils and tyres (twenty-seventh amendment of Council Directive 76/769/EEC)", Commission of the European Communities, Feb. 13, 2004, 9 pages.

* cited by examiner

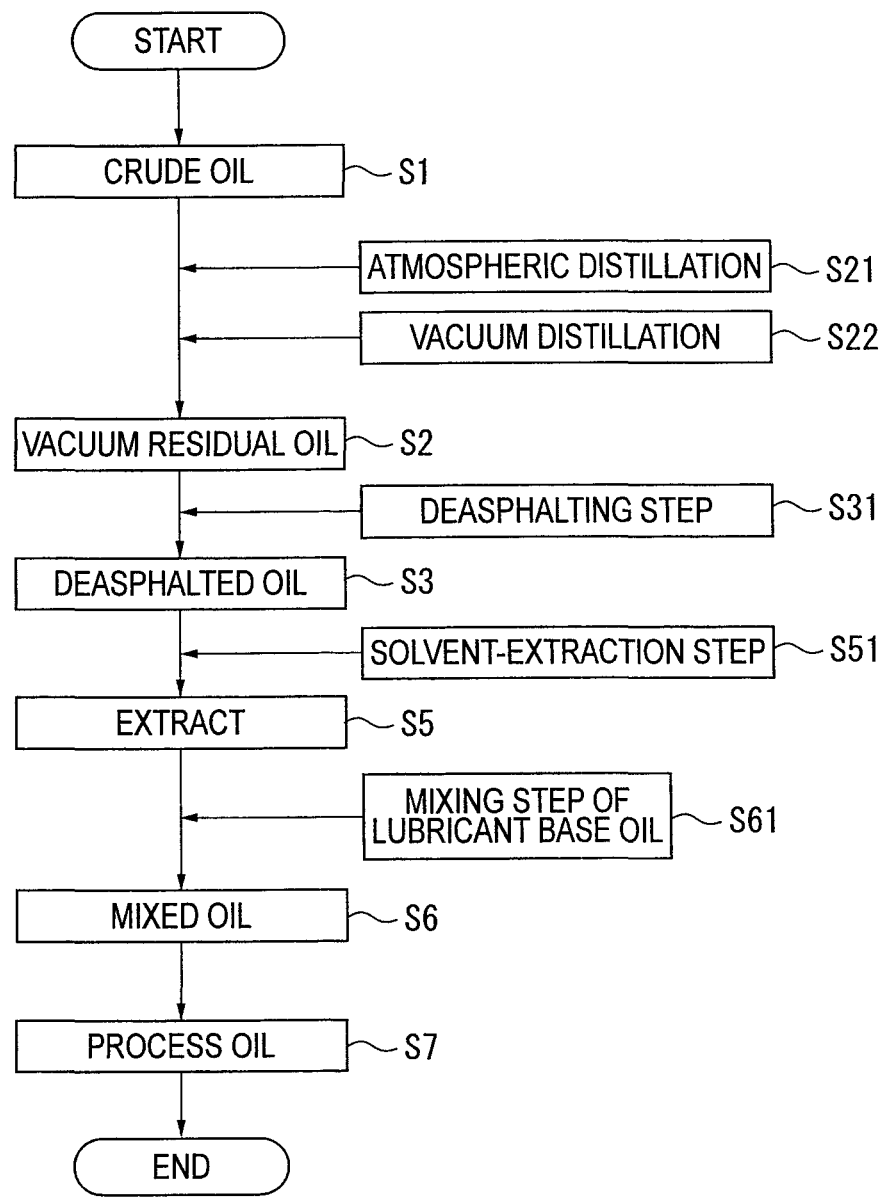

PROCESS OIL, PROCESS FOR PRODUCTION OF DEASPHALTED OIL, PROCESS FOR PRODUCTION OF EXTRACT, AND PROCESS FOR PRODUCTION OF PROCESS OIL

This is a divisional application of U.S. application Ser. No. 11/913,124, filed Oct. 30, 2007, which is a 371 of PCT/JP06/310692 filed on May 29, 2006.

TECHNICAL FIELD

The present invention is related to a process oil that is added to a natural rubber or a synthetic rubber to manufacture a rubber composition, manufacturing methods of a deasphalted oil and an extract as raw materials for manufacturing the process oil, and a manufacturing method of the process oil.

BACKGROUND ART

A process oil is typically added to a rubber material used for manufacturing a tire in order to enhance mechanical performances and processability of the rubber material. The process oil is used as: a constituent of a plasticizer for a thermoplastic resin; a constituent of a printing ink; and a lubricant or a solvent component used for a softener or the like for a recycled asphalt, as well as being used with rubber materials such as a natural rubber and a synthetic rubber.

For a process oil used as an additive for the rubber materials, there has been conventionally employed an extract that is a by-product produced in manufacturing a paraffinic base oil by solvent refining. However, due to a carcinogenicity problem, noncarcinogenic aromatic oils for tires have been being manufactured by various manufacturing methods.

In manufacturing a rubber for a tire, since compatibility of the process oil and the rubber material is regarded as important, an aromatic component of the process oil is an important factor. However, since excessive dependency on the aromatic component leads to increase of the carcinogenicity of the process oil, the aromatic oil as a source of the carcinogenicity has to be removed while maintaining the compatibility of the process oil and the rubber material in a proper state.

Furthermore, a hazardous effect of polycyclic aromatics (PCA; same meaning as PAH (PolyAromatic Hydrocarbon)) contained in the process oil has been acknowledged as a problem in recent years. Especially, since the process oil used for an automobile tire pollutes the environment via dusts of the tire, there has been a demand for reducing the PCA contained in the process oil. In Europe or other areas, a mineral oil having a PCA content of 3 mass % or more is restricted in handling. However, since an extracted oil with high aromatics content obtained by conventional manufacturing methods contains high contents of the polycyclic aromatics, it has been urgently required to develop a process oil with reduced PCA (specifically, less than 3 mass %) and a manufacturing method thereof.

With such background, there has been studied a technology for manufacturing a process oil with reduced PCA content and capable of balancing the compatibility with a rubber material and non-carcinogenicity. For example, a technology related to a manufacturing method of a process oil for a tire rubber has been disclosed, in which a naphthenic asphaltene and a solvent-extracted oil are combined (see, for instance, Patent Document 1). As another technology, there has been disclosed a manufacturing method of a process oil using an extract obtained by solvent-extracting a deasphalted oil (see, for instance, Patent Document 2 and Patent Document 3).
[Patent Document 1] JP-A-11-80434
[Patent Document 2] JP-A-2000-80208
[Patent Document 3] JP-A-2002-3861

DISCLOSURE OF THE INVENTION

Problems to be Solved by the Invention

However, while the process oil obtained by the technology disclosed in the Patent Document 1 ensures safety, a rubber composition containing the process oil did not exhibit performances equal to rubber compositions containing conventional aromatic oils. In process oils obtained by the technologies disclosed in the Patent Documents 2 and 3, since the deasphalted oil of a paraffinic residual oil is used as it is, the pour point thereof is high, which undesirably causes a wax component to be separated out on a surface of a rubber in a rubber composition using the process oil.

In addition, in the technologies disclosed in the Documents 2 and 3, the extract obtained by solvent-extracting the deasphalted oil is used in manufacturing the process oils. However, since the extract contains high content of an aromatic component, further processing such as extraction and hydrogenation are required to control the content of the aromatic component to be less than a regulation value, thus requiring many manufacturing steps.

An object of the present invention is to provide a process oil exhibiting performances equal to conventional aromatic oils while being noncarcinogenic and excellent in safety, as well as providing a simpler manufacturing method of the process oil. Another object of the present invention is to provide manufacturing methods of a deasphalted oil and an extract as raw materials that are favorably used in manufacturing the process oil.

Means for Solving the Problems

In order to solve the problem described above, a process oil according to a first aspect of the present invention uses as a raw material a deasphalted oil obtained by deasphalting a vacuum residual oil of a crude oil, the process oil having properties of (a) to (f) below:
(a) a polycyclic aromatics (PCA) content of less than 3 mass %;
(b) a viscosity (100° C.) of 40 to 70 $mm^2/s$;
(c) an aniline point of 85 to 100° C.;
(d) a flash point of 250° C. or higher;
(e) an aromatic hydrocarbon content of 40 to 55 mass %; and
(f) a polar substance content of 10 to 15 mass %.

According to the aspect of the present invention, the process oil uses as the raw material the deasphalted oil obtained by deasphalting the vacuum residual oil of the crude oil. With the PCA content being less than 3 mass %, the process oil is noncarcinogenic and excellent in safety. In addition, with the properties of (b) to (f), the process oil can maintain performances equal to conventional aromatic oils, so that a rubber composition made by adding the process oil to a natural rubber or a synthetic rubber will have preferable rubber properties, while being capable of preventing bleeding with the oil bleeding on a surface of a rubber and separation of a wax component.

Here, the process oil of the present invention uses the deasphalted oil as the raw material, which may be: a deasphalted oil; any one of oil components made of a deasphalted oil as a raw material such as a dewaxed oil (a dewaxed deasphalted oil) obtained by dewaxing the deasphalted oil and an extract extracted from the dewaxed oil; and a mixture of two or more of the oil components above.

The process oil of the present invention preferably has (g) pour point of 40° C. or lower. By setting the range of the pour point, the wax component is not separated out on the surface of a rubber to be manufactured, thus improving appearance and commercial value.

The process oil according to the aspect of the present invention preferably shows an ASTM color phase of 8.0 or lower when being diluted with a toluene of sixty times as large volume as the process oil Since the process oil of the present invention contains small content of an asphaltene component, when used for manufacturing of a colored asphalt, the asphalt will be finished with a good color.

By adjusting the process oil of the present invention to have (h) aniline point of 85 to 95° C., the PCA content becomes appropriate and the compatibility with a rubber material is improved, resulting in exhibiting the above described effects more effectively.

A process oil according to a second aspect of the present invention is obtained by mixing: an extract obtained by deasphalting and solvent-extracting a vacuum residual oil of a crude oil; and a lubricant base oil having a polycyclic aromatics (PCA) content of less than 3 mass %, the process oil having properties of: (a) and (i) to (n) below:
  (a) a polycyclic aromatics (PCA) content of less than 3 mass %;
  (i) a viscosity (100° C.) of 30 to 80 mm$^2$/s;
  (j) an aniline point of 90° C. or lower;
  (k) a flash point of 240° C. or higher;
  (l) a benzo(a)pyrene content of 1 mass ppm or less;
  (m) a specified aromatic compound content of 10 mass ppm or less; and
  (n) a polar substance content of 10 to 30 mass %.

According to the aspect of the present invention, the process oil is obtained by mixing an extract obtained by deasphalting and solvent-extracting the vacuum residual oil of the crude oil and a predetermined lubricant base oil, and the PCA content is less than 3 mass %, so that the process oil is noncarcinogenic and excellent in safety. In addition, with the properties of (i) to (n), the process oil can maintain performances equal to conventional aromatic oils, so that a rubber composition obtained by adding the process oil to a natural rubber or a synthetic rubber will have preferable rubber properties, while being capable of preventing bleeding with the oil bleeding on a surface of a rubber and separation of a wax component.

By adjusting the process oil of the present invention to have (o) aniline point of 60 to 90° C., the PCA content becomes appropriate and the compatibility with a rubber material is improved, resulting in exhibiting the above described effects more effectively.

A manufacturing method of a process oil according to a third aspect of the present invention includes: a deasphalting step for deasphalting a vacuum residual oil of a crude oil to obtain a deasphalted oil; and a solvent-extraction step for solvent-extracting the deasphalted oil to obtain an extract with a yield of 50 mass % or higher of the deasphalted oil, the extract being provided as the process oil.

According to the aspect of the present invention, since the manufacturing method includes the deasphalting step for obtaining the deasphalted oil from the vacuum residual oil of the crude oil and the solvent-extraction step for solvent-extracting the deasphalted oil to obtain the extract as the process oil, the process oil having the properties of (a) to (f) described above can be properly provided.

In the solvent-extraction step for solvent-extracting the deasphalted oil to obtain the extract, the extract is obtained with the yield of 50 mass % or higher of the deasphalted oil and the extract is provided as the process oil, so that the process oil with the PCA content of less than 3 mass % can be securely obtained.

A manufacturing method of a process oil according to a fourth aspect of the present invention includes: a deasphalting step for deasphalting a vacuum residual oil of a crude oil to obtain a deasphalted oil; and a solvent-extraction step for solvent-extracting the deasphalted oil to obtain an extract, in which the extract obtained in the solvent-extraction step and at least one member selected from the group consisting of the deasphalted oil obtained in the deasphalting step and a mineral oil having a polycyclic aromatics (PCA) content of less than 3 mass % are mixed to obtain a mixed oil, the mixed oil being provided as the process oil.

The mixed oil of the extract and the deasphalted oil obtained in the deasphalting step or the mineral oil with the polycyclic aromatics (PCA) content of less than 3 mass % may be provided as the process oil. Even with the arrangement, the process oil having the properties of (a) to (f) can also be provided properly.

In such case, it is not necessary to obtain the extract with the yield of 50 mass % or higher of the deasphalted oil in the solvent-extraction step for obtaining the extract from the deasphalted oil, but it is only necessary to mix the extract obtained with a desired yield and at least one member selected from the group consisting of the deasphalted oil obtained in the deasphalting step and the mineral oil with the PCA content of less than 3 mass % in order to obtain the process oil. However, there is also no problem in employing the extract obtained with the yield of 50 mass % or higher of the deasphalted oil, of which the PCA content is expected to be low.

A manufacturing method of a process oil according to a fifth aspect of the present invention includes: a deasphalting step for deasphalting a vacuum residual oil of a crude oil to obtain a deasphalted oil; a dewaxing step for dewaxing the deasphalted oil to obtain a dewaxed oil; and a solvent-extraction step for solvent-extracting the dewaxed oil to obtain an extract with a yield of 50 mass % or higher of the deasphalted oil, the extract being provided as the process oil.

According to the aspect of the present invention, since the manufacturing method includes the deasphalting step for obtaining the deasphalted oil from the vacuum residual oil of the crude oil, the dewaxing step for obtaining the dewaxed oil from the deasphalted oil and the solvent-extraction step for solvent-extracting the dewaxed oil to obtain the extract as the process oil, the process oil having the properties of (a) to (f) described above can be properly provided.

Especially, dewaxing the deasphalted oil can provide proper fluidity to the process oil, which accordingly facilitates handling of the oil, while preventing the wax component from being separated out on the surface of a rubber to be manufactured.

In the solvent-extraction step for extracting the dewaxed oil to obtain the extract, the extract is obtained with a yield of 50 mass % or higher of the deasphalted oil and the extract is provided as the process oil, so that the process oil with the PCA content of less than 3 mass % can be securely obtained.

A manufacturing method of a process oil according to a sixth aspect of the present invention includes: a deasphalting step for deasphalting a vacuum residual oil of a crude oil to obtain a deasphalted oil; a dewaxing step for dewaxing the deasphalted oil to obtain a dewaxed oil; and a solvent-extraction step for solvent-extracting the dewaxed oil to obtain an extract, in which the extract obtained in the solvent-extraction step and at least one member selected from the group consisting of the dewaxed oil obtained in the dewaxing step and a mineral oil having a polycyclic aromatics (PCA) content of less than 3 mass % are mixed to obtain a mixed oil, the mixed oil being provided as the process oil.

The mixed oil of the extract and the dewaxed oil obtained in the dewaxing step or the mineral oil with the polycyclic aromatics (PCA) content of less than 3 mass % may be provided as the process oil. Even with the arrangement, the process oil having the properties of (a) to (f) can also be provided properly.

In such case also, it is not necessary to obtain the extract with the yield of 50 mass % or higher of the deasphalted oil in the solvent-extraction step for obtaining the extract from the dewaxed oil, but only necessary to mix the extract obtained with a desired yield and at least one member selected from the group consisting of the dewaxed oil obtained in the dewaxing step and the mineral oil with the PCA content of less than 3 mass % in order to obtain the process oil. However, of course, there may also be employed the extract obtained with the yield of 50 mass % or higher of the deasphalted oil, of which the PCA content is expected to be low.

When the mixed oil obtained by mixing the extract and at least one member selected from the group consisting of the deasphalted oil (or the dewaxed oil) and the mineral oil with the PCA content of less than 3 mass % is used as the process oil, it is preferable to adjust the content of the extract in the range from 40 mass % to 80 mass %.

According to the aspect of the invention, by setting the content of the extract in the range from 40 mass % to 80 mass % when the mixed oil obtained by mixing the extract and the deasphalted oil or the like is used as the process oils, the process oil having the properties of (a) to (f) can be obtained effectively, thus enhancing properties of the rubber composition.

In the manufacturing method of the process oil according to the aspect of the present invention, it is preferable that a yield of the deasphalted oil obtained in the deasphalting step is 30 mass % or higher of the vacuum residual oil, and a viscosity at 100° C. of the deasphalted oil is 30 to 50 mm²/s.

According to the aspect of the present invention, since the yield of the deasphalted oil obtained in the deasphalting step is 30 mass % or higher of the vacuum residual oil in the manufacturing method of the process oil, the viscosity at 100° C. of the deasphalted oil can be adjusted to 30 mm²/s or higher and foaming in the deasphalting step can be prevented, thus achieving consistent production of the deasphalted oil.

By adjusting the viscosity at 100° C. of the deasphalted oil to be 30 to 50 mm²/s, the viscosity at 100° C. of the resulting process oil can be easily adjusted to 40 to 70 mm²/s.

In the manufacturing method of the process oil according to the aspect of the present invention, it is preferable that a pour point of the dewaxed oil obtained in the dewaxing step is 0 to 25° C., and a yield of the dewaxed oil is 90 mass % or higher of the deasphalted oil.

According to the aspect of the present invention, since the pour point of the dewaxed oil obtained in the dewaxing step is adjusted to be 0 to 25° C. in the manufacturing method of the process oil, the pour point of the resulting process oil can be easily adjusted to 40° C. or lower.

Since the yield of the dewaxed oil is set to 90 mass % or higher of the deasphalted oil, when, for instance, a hydrodewaxing is employed in the dewaxing step, decrease in yield due to decomposition can be prevented, and when a solvent dewaxing is employed in the dewaxing step, generation of the wax component can be minimized, thereby preferably preventing decrease in production efficiency.

In the manufacturing method of the process oil according to the aspect of the present invention, it is preferable that an extraction temperature in the solvent-extraction step is 80 to 150° C., and a solvent ratio is 2.0 to 12.0.

According to the aspect of the present invention, since specific ranges are set for the extraction temperature and the solvent ratio in the solvent-extraction step in the manufacturing step of the process oil, the extract with the PCA content of less than 3 mass % can be obtained efficiently.

According to a seventh aspect of the present invention, a manufacturing method of a deasphalted oil using as a raw material a vacuum residual oil of a crude oil includes deasphalting the vacuum residual oil using as a solvent a propane or a mixed solvent of a butane and a propane under conditions of: a solvent ratio of 4.5 to 6; a column top temperature of 85 to 100° C.; and a yield for the deasphalted oil of 30 to 40 vol %, the deasphalted oil having properties of (a), (l) and (m) below:

(a) a polycyclic aromatics (PCA) content of less than 3 mass %;
(l) a benzo(a)pyrene content of 1 mass ppm or less; and
(m) a specified aromatic compound content of 10 mass ppm or less.

According to the aspect of the present invention, since the deasphalted oil with reduced content of the specified aromatic compound can be easily obtained, the superior extract can be easily manufactured from the deasphalted oil as a crude material, the extract being the raw material of the process oil having the properties of (a) and (i) to (n).

According to an eighth aspect of the present invention, a manufacturing method of an extract using as a raw material a deasphalted oil obtained by deasphalting a vacuum residual oil of a crude oil includes: solvent-extracting the deasphalted oil under conditions of: an extraction temperature of 80 to 150° C.; and a solvent ratio of 2.0 to 15.0, the extract having properties of (l) and (m) below:

(l) a benzo(a)pyrene content of 1 mass ppm or less; and
(m) a specified aromatic compound content of 10 mass ppm or less.

According to the aspect of the present invention, since the extract with reduced content of the specified aromatic compound can be easily obtained, the process oil being excellent in safety with the properties of (a) and (i) to (n) can be easily manufactured from the extract as the raw material.

According to an ninth aspect of the present invention, a manufacturing method of a process oil includes: a deasphalting step for deasphalting a vacuum residual oil of a crude oil to obtain a deasphalted oil; and a solvent-extraction step for solvent-extracting the deasphalted oil to obtain an extract; in which the extract obtained in the solvent-extraction step and a lubricant base oil having a polycyclic aromatics (PCA) content of less than 3 mass % are mixed to obtain a mixed oil, the mixed oil being provided as the process oil.

With the manufacturing method of the process oil of the present invention, the process oil having the properties of (a) and (i) to (n) described above can be provided property.

In the manufacturing method of the process oil according to the aspect of the present invention, it is preferable that the lubricant base oil further has properties of (p) to (r), (l) and (m) below.

(p) a viscosity (100° C.) of 5 to 40 mm²/s;
(q) an aniline point of 75 to 120° C.;
(r) a flash point of 200° C. or higher;
(l) a benzo(a)pyrene content of 1 mass ppm or less; and
(m) a specified aromatic compound content of 10 mass ppm or less.

With the lubricant base oil having such properties, it becomes even easier to obtain the process oil having the properties of (a) and (i) to (n) by mixing the extract and the lubricant base oil.

According to the aspect of the present invention, in the manufacturing method of the process oil, a volume mixing ratio of the extract and the lubricant base oil is preferably set to 95/5 to 60/40.

By setting the mixing volume ratio of the extract and the lubricant base oil to the range described above, it becomes even easier to obtain the process oil having the properties of (a) and (i) to (n).

BRIEF DESCRIPTION OF DRAWINGS

FIG. 3 is a flow chart showing an example of a manufacturing method of a process oil according to a second embodiment of the present invention.

BEST MODE FOR CARRYING OUT THE INVENTION

First Embodiment

Figure 1:
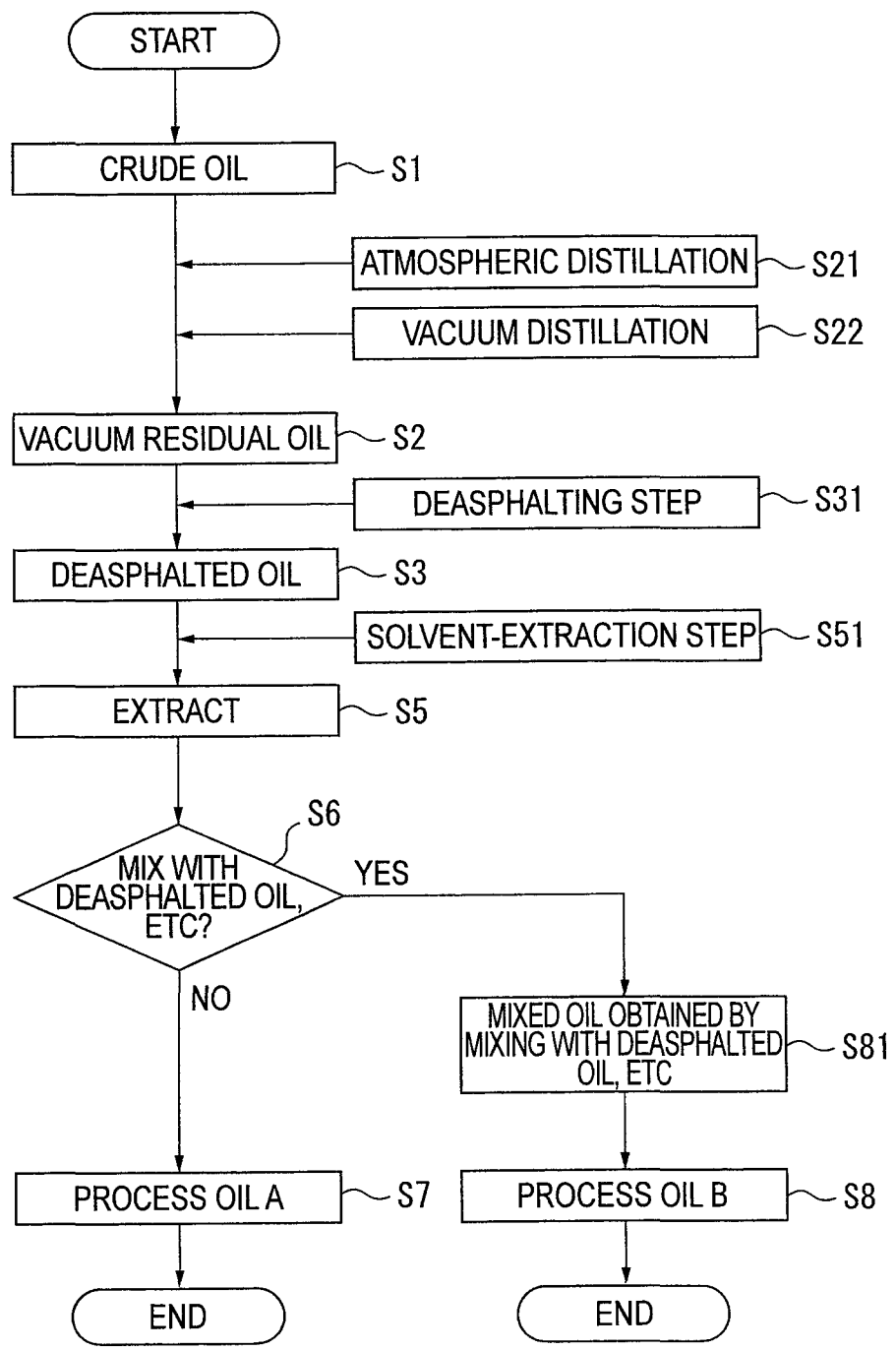
FIG. 1 is a flow chart showing an example of a manufacturing method of a process oil according to a first embodiment of the present invention.

A process oil and a manufacturing method of the process oil according to a first embodiment of the present invention will be described below.

The process oil of the present embodiment uses as a raw material a deasphalted oil obtained by deasphalting a vacuum residual oil of a crude oil, the process oil having properties of (a) to (f) below:

(a) a polycyclic aromatics (PCA) content of less than 3 mass %;
(b) a viscosity (100° C.) of 40 to 70 mm²/s;
(c) an aniline point of 85 to 100° C.;
(d) a flash point of 250° C. or higher;
(e) an aromatic hydrocarbon content of 40 to 55 mass %; and
(f) a polar substance content of 10 to 15 mass %.

(a) Content of Polycyclic Aromatics (PCA):

The PCA content in the process oil of the present embodiment should be less than 3 mass %, and preferably less than 2.5 mass %. Since a mineral oil having the PCA content of 3 mass % or more is restricted in handling in Europe or other areas due to its carcinogenicity, the PCA content in the process oil of the present embodiment is accordingly set to less than 3 mass %. By setting the PCA content to less than 3 mass %, the process oil being noncarcinogenic and excellent in safety can be provided.

The PCA content in the process oil may be measured in compliance with IP346 (92) standardized by The Institute of Petroleum.

(b) Viscosity (100° C.):

The viscosity at 100° C. of the process oil of the present embodiment should be 40 to 70 mm²/s, and preferably 40 to 55 mm²/s. When the viscosity is lower than 40 mm²/s, normal state properties of a rubber to which the process oil is added will be degraded. When the viscosity exceeds 70 mm²/s, the viscosity is too high, which adversely affects molding-processability and operability in being added to the rubber as well as degrading rubber properties.

Incidentally, the viscosity at 100° C. of the process oil may be measured in compliance with ASTM D445.

(c) Aniline Point:

The aniline point of the process oil of the present embodiment should be 85 to 100° C., and preferably 85 to 95° C. (i.e., property (h)). When the aniline point is lower than 85° C., the PCA content increases and possibly exceeds 3 mass % as a regulation value. On the other hand, when the aniline point exceeds 100° C., compatibility with the rubber material is degraded, which might generate bleeding.

Aniline points of conventional process oils have been typically set to 80° C. or lower because the lower aniline point has been considered to less likely generate the bleeding in terms of the compatibility with the rubber material. However, by manufacturing the process oil by, for instance, mixing the extract obtained by solvent-extracting a dewaxed oil and a dewaxed oil by a desired mixing ratio to control (e) content of aromatic hydrocarbon and (f) content of polar substance to be in the range from 40 to 55 mass % and 10 to 15 mass % respectively, the bleeding can be sufficiently prevented even with the aniline point of 80° C. or higher.

Incidentally, the aniline point of the process oil may be measured in compliance with ASTM D611.

(d) Flash Point:

The flash point of the process oil of the present embodiment should be 250° C. or higher, and preferably 280° C. or higher. When the flash point is lower than 250° C., the process oil is easy to vaporize, which causes a problem in safety and adversely affects the environment.

Incidentally, the flash point of the process oil may be measured in compliance with ASTM D92.

(e) Content of Aromatic Hydrocarbon:

The aromatic hydrocarbon content in the process oil of the present embodiment should be 40 to 55 mass %, and preferably 45 to 55 mass %. When the aromatic hydrocarbon content is less than 40 mass %, the compatibility with the rubber material is degraded, which makes it difficult to add the process oil to manufacture a rubber, and adversely affect the properties of the rubber. On the other hand, when the aromatic hydrocarbon content exceeds 55 mass %, the PCA content increases and possibly exceeds 3 mass % as the regulation value.

Incidentally, the aromatic hydrocarbon content in the process oil may be measured in compliance with ASTM D2007.

(f) Content of Polar Substance:

The polar substance content in the process oil of the present embodiment should be 10 to 15 mass %, and preferably 12 to 15 mass %. When the polar substance content is less than 10 mass %, the compatibility with the rubber material is degraded. On the other hand, when the polar substance content exceeds 15 mass %, it adversely affects the properties of the rubber when added to the rubber, and further, the PCA content increases and possibly exceeds 3 mass % as the regulation value.

Incidentally, the content of the polar substance of the process oil may be measured in compliance with ASTM D2007.

(g) Pour Point:

The pour point of the process oil of the present embodiment is preferably 40° C. or lower, and more preferably 20° C. or lower. When the pour point is higher than 40° C., a wax component is separated out on a surface of the rubber to be manufactured, which degrades the appearance and a commercial value of the rubber to be manufactured.

Incidentally, the pour point of the process oil may be measured in compliance with ASTM D97.

Note that the process oil of the present embodiment preferably exhibits ASTM color phase of 8.0 or lower when being diluted by a toluene of 60 times as large volume as the process oil, and more preferably 6.0 or lower. By adjusting the ASTM color phase to be 8.0 or lower, content of an asphaltene component becomes small, and thus when used for manufacturing of a colored asphalt, the asphalt will be finished with a good color.

Now, examples of a procedure to manufacture the process oil of the present embodiment will be described below.

A first procedure of the manufacturing method of the process oil of the present embodiment includes: a deasphalting step for deasphalting a vacuum residual oil of a crude oil to obtain a deasphalted oil; and a solvent-extraction step for solvent-extracting the deasphalted oil to obtain an extract with a yield of 55 mass % or higher of the deasphalted oil to provide the extract oil as the process oil. With the procedure of the manufacturing method, the process oil having the properties of (a) to (f) described above can be obtained efficiently.

Note that in the first procedure that includes the deasphalting step for deasphalting the vacuum residual oil of the crude oil to obtain the deasphalted oil and the solvent-extraction step for solvent-extracting the deasphalted oil to obtain the extract, a mixed oil obtained by mixing the extract obtained in the solvent-extraction step and at least one member selected from the group consisting of the deasphalted oil obtained in the deasphalting step and a mineral oil with the polycyclic aromatics (PCA) content of less than 3 mass % may be provided as the process oil (first procedure-b). With such arrangement, the process oil having the properties of (a) to (f) described above can be properly provided.

A second procedure of the manufacturing method of the process oil of the present embodiment includes: a deasphalting step for deasphalting a vacuum residual oil of a crude oil to obtain a deasphalted oil; a dewaxing step for dewaxing the deasphalted oil to obtain a dewaxed oil; and a solvent-extraction step for solvent-extracting the dewaxed oil to obtain an extract with a yield of 50 mass % or higher of the deasphalted oil to provide the extract as the process oil. With the procedure of the manufacturing method also, the process oil having the properties of (a) to (f) described above can be obtained efficiently.

Especially, as compared to the first procedure, dewaxing the deasphalted oil can provide proper fluidity to the process oil, which accordingly facilitates handling of the oil and prevents the wax component from being separated out on the surface of the rubber.

Note that also in the second procedure that includes the deasphalting step for deasphalting the vacuum residual oil of the crude oil to obtain the deasphalted oil, the dewaxing step for dewaxing the deasphalted oil to obtain the dewaxed oil and the solvent-extraction step for solvent-extracting the dewaxed oil to obtain the extract, a mixed oil obtained by mixing the extract obtained in the solvent-extraction step and at least one member selected from the group consisting of the deasphalted oil obtained in the deasphalting step or the dewaxed oil obtained in the dewaxing step and a mineral oil with the polycyclic aromatics (PCA) content of less than 3 mass % may be provided as the process oil (second procedure-b). With such arrangement, the process oil having the properties of (a) to (f) described above can be properly provided.

Now, (I) deasphalting step and (III) solvent-extraction step included in the first procedure and (II) dewaxing step included in the second procedure between the steps (I) and (III) will be described in detail below.

(I) Deasphalting Step:

In the deasphalting step, the vacuum residual oil, which has been obtained by performing atmospheric distillation and vacuum distillation on the crude oil, is deasphalted to obtain the deasphalted oil.

Here, in order to perform the atmospheric distillation on the crude oil, a conventional atmospheric distillation device and a conventional distillation condition can be used. Specifically, for instance, the crude oil such as a paraffinic crude oil or a naphthenic crude oil, which is an object to be refined, is heated to about 350° C. in a heating furnace or the like and sent out to an atmospheric distillation column, which is then turned to be a petroleum vapor in the atmospheric distillation column. After cooling, the petroleum vapor is sequentially fractionated into fractions in the ascending order of boiling points. Since the vacuum residual oil is obtained by the atmospheric distillation and the vacuum distillation in the present embodiment, it may be so arranged to obtain an atmospheric residual oil having boiling point of 350° C. or higher.

Next, further distillation (vacuum distillation) under reduced pressure is performed on the obtained atmospheric residual oil. The vacuum distillation may be performed using a conventional vacuum distillation device and a conventional operating condition, and the vacuum distillation fractionates the atmospheric residual oil into fractions such as a vacuum naphtha, a vacuum light gas oil and a vacuum residual oil, from which the vacuum residual oil is obtained.

Then, the vacuum residual oil is separated into an oil component (deasphalted oil) and an asphalt component using a solvent such as a liquefied propane. Deasphalting using the liquefied propane is performed by, for instance, adding the liquefied propane to the vacuum residual oil by an amount of 4 to 8 times as large volume as that of the vacuum residual oil, while setting temperature to 40-80° C. in order to extract the deasphalted oil.

Here, the yield of the obtained deasphalted oil in the deasphalting step is preferably 30 mass % or higher of the vacuum residual oil, more preferably, 35 mass % or higher. With the yield of the obtained deasphalted oil being 30 mass % or higher of the vacuum residual oil, the viscosity at 100° C. of the deasphalted oil can be adjusted to 30 mm$^2$/s or higher and foaming in the deasphalting step can be prevented, thus achieving consistent production of the deasphalted oil.

By adjusting the viscosity at 100° C. of the deasphalted oil to be 30 to 50 mm$^2$/s, the viscosity at 100° C. of the resulting process oil can be easily adjusted to 40 to 70 mm$^2$/s.

The viscosity at 100° C. of the obtained deasphalted oil is preferably 30 to 50 mm$^2$/s, and more preferably 35 to 45 mm$^2$/s. By adjusting the viscosity at 100° C. of the deasphalted oil to 30 to 50 mm$^2$/s, the viscosity at 100° C. of the resulting process oil to be obtained can be easily adjusted to 40 to 70 mm$^2$/s.

(II) Dewaxing Step:

In the dewaxing step required in the second procedure, a paraffin wax component of the above-described deasphalted oil is separated to obtain the dewaxed oil. Performing the dewaxing step gives proper fluidity to the resulting process oil, which allows handling thereof to be facilitated and prevents the wax component from being separated out on the surface of the rubber to be manufactured.

In the dewaxing step, the dewaxing should preferably be performed so that the pour point of the obtained dewaxed oil is 0 to 25° C., and more preferably 10 to 20° C. By adjusting the pour point of the dewaxed oil to 0 to 25° C., particularly 10 to 20° C., the pour point of the resulting process oil to be manufactured can be easily adjusted to 40° C. or lower.

Examples of dewaxing method for dewaxing the deasphalted oil so that the dewaxed oil to be obtained has the pour point of the above-described range may include hydrodewaxing and solvent dewaxing.

As the hydrodewaxing, for instance, dewaxing using ZSM-5 catalyst (Exxon Mobil Corporation) is preferably performed.

The hydrodewaxing is preferably performed under the following conditions: pressure=1 to 16 mPa; LHSV (liquid hourly space velocity)=0.1 to 5.0/hour; and hydrogen/oil ratio=100 to 800 Nm$^3$/kL so that the pour point of the dewaxed oil to be obtained is within the range of 0 to 25° C.

Examples of solvents used in the solvent dewaxing may include, a methyl ethyl ketone, a toluene, a benzene and the like, and a mixed solvent thereof, particularly a mixed solvent of the methyl ethyl ketone and the toluene, may be preferable for use. When using the mixed solvent of the methyl ethyl ketone and the toluene, mixing ratio thereof may be around 40/60 to 60/40. In the solvent dewaxing, the solvent as described above is added to the deasphalted oil, which is then cooled. Then, precipitated wax crystal is filtered and separated.

The yield of the dewaxed oil is preferably 90 mass % or higher of the deasphalted oil, and more preferably 95 mass % or higher. With the yield of the dewaxed oil being 90 mass % or higher of the deasphalted oil, when, for instance, hydrodewaxing is employed as the dewaxing method, decrease in the yield due to decomposition can be prevented, and when solvent dewaxing is employed as the dewaxing method, generation of the wax component can be saved to be small, thereby preferably preventing decrease in production efficiency from decreasing.

(III) Solvent Extraction Step:

In the solvent-extraction step, the deasphalted oil obtained in the above-described deasphalting step (in the first procedure) or the dewaxed oil obtained in the above-described dewaxing step (in the second procedure) is solvent-extracted using a polar solvent to obtain the extract. By solvent-extracting the deasphalted oil or the dewaxed oil to obtain the extract, the PCA content of the process oil can be easily maintained to be less than 3 mass %, and the aniline point can be appropriately adjusted, thereby preventing generation of the bleeding.

Here, examples of available polar solvents may include a furfural, a N-methyl-2-pyrrolidone (NMP), a phenol, a cresol, a sulfolane, a dimethylsulfoxide, a formylmorpholine and the like, especially the furfural and the N-methyl-2-pyrrolidone (NMP) may be preferable for use.

In the solvent-extraction step, the solvent ratio (volume ratio of solvent/dewaxed oil or deasphalted oil) is preferably 2.0 to 12.0, and more preferably 5.0 to 10.0. In this case, the extraction temperature is preferably 80 to 150° C., and more preferably 90 to 130° C. By performing the solvent-extraction under the conditions above, the extract with the PCA content of less than 3 mass % can be efficiently obtained.

The yield of the extract obtained in the solvent-extraction step should be 50 mass % or higher of the deasphalted oil, and preferably 60 mass % or higher. As long as the yield of the extract is 50 mass % or higher of the deasphalted oil, the process oil with the PCA content of less than 3 mass % can be properly obtained.

Incidentally, in order to obtain the extract with the yield of 50 mass % or higher of the deasphalted oil, for instance, when the furfural is used as the solvent, the solvent ratio may be around 10 to 12 and the extraction temperature may be around 120 to 150° C., whereas, when the NMP is used as the solvent, the solvent ratio may be around 5 to 8 and the extraction temperature may be around 100 to 120° C.

Meanwhile, as in the first procedure-b and the second procedure-b, when the mixed oil obtained by mixing the extract from the deasphalted oil (or the dewaxed oil) with at least one member selected from the group consisting of the deasphalted oil (or the dewaxed oil) and the mineral oil having the PCA content of less than 3 mass % is provided as the process oil, the yield of the extract in the solvent-extraction step for obtaining the extract from the deasphalted oil (or the dewaxed oil) is not necessarily to be 50 mass % or higher of the deasphalted oil. It is only necessary to mix the extract obtained with a desired yield with at least one member selected from the group consisting of the deasphalted oil obtained by the deasphalting step (or the dewaxed oil obtained in the dewaxing step) and the mineral oil having the PCA content of less than 3 mass %. With the arrangement, when the yield of the used extract is lower than 50 mass % or higher of the deasphalted oil, the PCA content of the extract can be 3 mass % or more, but by mixing this extract with the mineral oil or the deasphalted oil (or the dewaxed oil), the PCA content can be controlled to be less than 3 mass %, so that requirements of the properties of (b) to (f) described above can be achieved.

Incidentally, there is no problem in using the extract obtained with the yield of 50 mass % or higher of the deasphalted oil, of which the PCA content is expected to be small.

Here, the obtained extract can be used as it is as the process oil with 100 mass % content of the extract.

On the other hand, the mixed oil obtained by mixing the extract and at least one member selected from the group consisting of the deasphalted oil obtained in the deasphalting step and the mineral oil with the polycyclic aromatics (PCA) content of less than 3 mass % may be provided as the process oil in the first procedure, while the mixed oil obtained by mixing the extract and at least one member selected from the group consisting of the dewaxed oil obtained in the dewaxing step and the mineral oil with the polycyclic aromatics (PCA) content of less than 3 mass % may be provided as the process oil in the second procedure. As described above, when the mixed oil is provided as the process oil, the extract content is preferably in the range from 40 mass % to below 100 mass %, and more preferably in the range from 50 mass % to below 100 mass %. While the process oil consisting of 100 mass % of the extract can properly achieve the properties of (a) to (f) described above, the process oil consisting of the mixed oil of the extract and the deasphalted oil and the like, in which the extract content is in the range from 40 mass % to below 100 mass %, can also properly achieve the properties of (a) to (f) described above.

Now, the first procedure of the manufacturing method of the process oil of the present embodiment will be described referring to the flowchart in FIG. 1. First, the atmospheric distillation is performed on the crude oil to obtain the atmospheric residual oil and the vacuum distillation is performed on the atmospheric residual oil to obtain the vacuum residual oil ($S_1$, $S_{21}$, $S_{22}$ and $S_2$). Then, the obtained vacuum residual oil is deasphalted in the deasphalting step to obtain the deasphalted oil ($S_{31}$, $S_3$). The obtained deasphalted oil is then solvent-extracted in the solvent-extraction step to obtain the extract ($S_{51}$, $S_5$).

Here, when the extract is not mixed with the deasphalted oil and/or the mineral oil with the polycyclic aromatics (PCA) content of less than 3 mass %, the extract obtained with the yield of 50 mass % or higher of the deasphalted oil should be employed.

When the obtained extract is not mixed with the deasphalted oil and/or the mineral oil with the polycyclic aromatics (PCA) content of less than 3 mass % (i.e., "NO" is chosen in $S_6$), it can be used as it is as the process oil (process oil A in $S_7$). The obtained extract can also be mixed with the deasphalted oil and the like, and the mixed oil can be provided as the process oil (i.e., "YES" is chosen in $S_6$, and go through $S_{81}$ to obtain process oil B in $S_8$).

Figure 2:
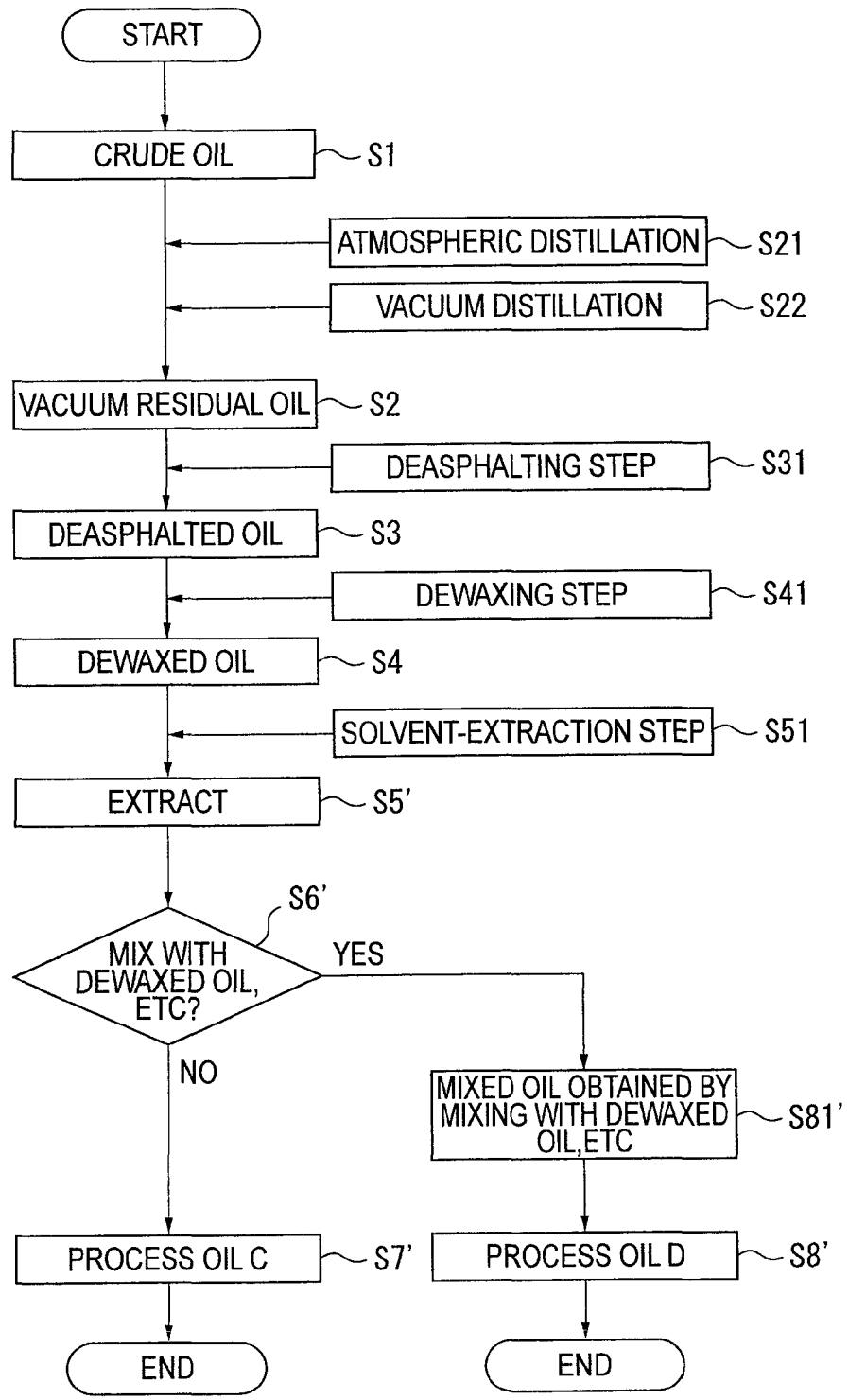
FIG. 2 is a flow chart showing another example of a manufacturing method of a process oil according to the first embodiment of the present invention.

Now, the second procedure of the manufacturing method of the process oil of the present embodiment will be described referring to the flowchart in FIG. 2. First, the atmospheric distillation is performed on the crude oil to obtain the atmospheric residual oil and the vacuum distillation is performed on the atmospheric residual oil to obtain the vacuum residual oil ($S_1$, $S_{21}$, $S_{22}$ and $S_2$). Then, the obtained vacuum residual oil is deasphalted in the deasphalting step to obtain the deasphalted oil ($S_{31}$, $S_3$). The steps so far are the same as those in the first procedure.

Next, the deasphalted oil is dewaxed in the dewaxing step to obtain the dewaxed oil ($S_{41}$, $S_4$), and the obtained dewaxed oil is solvent-extracted in the solvent-extraction step to obtain the extract ($S_{51}$, $S_5$).

When the obtained extract is not mixed with the dewaxed oil and/or the mineral oil with the polycyclic aromatics (PCA) content of less than 3 mass % (i.e., "NO" is chosen in $S_{6'}$), it can be used in situ as the process oil (process oil C in $S_{7'}$). The obtained extract can also be mixed with the dewaxed oil and the like, and the mixed oil can be provided as the process oil (i.e., "YES" is chosen in $S_{6'}$, and go through $S_{81'}$ to obtain process D in $S_{8'}$).

Note that, in the second procedure also, when the extract is not mixed with the dewaxed oil and/or the mineral oil with the polycyclic aromatics (PCA) content of less than 3 mass %, the extract obtained with the yield of 50 mass % or higher of the deasphalted oil should be employed.

Advantage of First Embodiment

Since the process oil obtained in the first embodiment described above has the properties of (a) to (f), the process oil exhibits various performances that the conventional process has required, such as processability and anti-bleeding performance of the rubber. In addition, since the PCA content that is hazardous to human bodies is controlled to be less than 3 mass %, the process oil is noncarcinogenic and thus excellent in safety.

Addition of the process oil to the natural rubber or the synthetic rubber can properly provide various types of rubber compositions, and the obtained rubber compositions can be used for various rubber products such as tires.

Further, the process oil can also be used as a plasticizer for the thermoplastic resin, a constituent of a printing ink and a softener for a modified asphalt used in paving.

Incidentally, since the conventional process oil contains high content of the asphaltene component, the appearance thereof is blackish brown, so that its application has been limited to tires. In contrast, since the process oil of the present embodiment uses the deasphalted oil and the appearance thereof is improved, application can be expanded to a plasticizer for a resin, the softener for the modified asphalt used in paving, of which the demand has been increased these years, and a color asphalt focused on fashionability.

When a rubber (rubber composition) is manufactured using the process oil of the present embodiment, content of the process oil may be, for instance, 10 to 50 parts by weight, and preferably 20 to 40 parts by weight relative to 100 parts by weight of a rubber component.

Also, in order to manufacture the rubber composition, a reinforcer such as a carbon black and a silica, a vulcanizing agent, a vulcanization accelerator, a filler, an anti-oxidant such as waxes, a softener other than the process oil of the present embodiment, a plasticizer, etc., which are generally used in rubber industry, may appropriately be added in addition to the process oil of the present embodiment and the rubber component.

Second Embodiment

A process oil and a manufacturing method of the process oil according to a second embodiment of the present invention will be described below.

The process oil of the present embodiment is obtained by mixing: an extract solvent-extracted from a deasphalted oil that has been obtained by deasphalting a vacuum residual oil of a crude oil; and a lubricant base oil with a polycyclic aromatics (PCA) content of less than 3 mass %, the process oil having properties of (a) and (i) to (n) below:
 (a) a polycyclic aromatics (PCA) content of less than 3 mass %;
 (i) a viscosity (100° C.) of 30 to 80 mm$^2$/s;
 (j) an aniline point of 90° C. or lower;
 (k) a flash point of 240° C. or higher;
 (l) a benzo(a)pyrene content of 1 mass ppm or less;
 (m) a specified aromatic compound content of 10 mass ppm or less; and
 (n) a polar substance content of 10 to 30 mass %.

(a) Content of Polycyclic Aromatics (PCA):

The PCA content in the process oil of the present embodiment should be less than 3 mass %, and preferably less than 2.5 mass %. Since a mineral oil with the PCA content of 3 mass % or more is restricted in handling in Europe or other areas due to its carcinogenicity, the PCA content in the process oil of the present embodiment is accordingly set to less than 3 mass %. By setting the PCA content to less than 3 mass %, the process oil being noncarcinogenic and excellent in safety can be provided.

The PCA content in the process oil may be measured in compliance with IP346 (92) standardized by The Institute of Petroleum.

(i) Viscosity (100° C.):

The viscosity at 100° C. of the process oil of the present embodiment should be 30 to 80 mm$^2$/s, and preferably 40 to 60 mm$^2$/s. When the viscosity is lower than 30 mm$^2$/s, normal state properties of a rubber to which the process oil is added will be degraded. When the viscosity exceeds 80 mm$^2$/s, the viscosity is too high, which adversely affects molding-processability and operability in being added to the rubber as well as degrading rubber properties.

Incidentally, the viscosity at 100° C. of the process oil may be measured in compliance with ASTM D445.

(j) Aniline Point:

The aniline point of the process oil of the present embodiment should be 90° C. or lower, and preferably 60 to 90° C. (i.e., property (o)). When the aniline point exceeds 90° C., compatibility of the process oil and the rubber material is degraded, which might cause the process oil to bleed on the surface of the rubber. Although lower limit of the aniline point is not particularly specified, when the aniline point is lower than 60° C., the PCA content increases and possibly exceeds 3 mass % as a regulation value. The aniline point of the process oil may be measured in compliance with ASTM D611.

(k) Flash Point:

The flash point of the process oil of the present embodiment should be 240° C. or higher, and preferably 260° C. or higher. When the flash point is lower than 240° C., the process oil is easy to vaporize, which causes a problem in safety and adversely affects the environment.

Incidentally, the flash point of the process oil may be measured in compliance with ASTM D92.

(l) Content of Benzo(a)pyrene:

The content of the benzo(a)pyrene in the process oil of the present embodiment is 1 mass ppm or less.

Although the benzo(a)pyrene is a carcinogenic substance, since the contents thereof is set to 1 mass ppm or less, there is no need to concern about its carcinogenicity, thereby providing the process oil that is excellent in safety.

(m) Content of Specified Aromatic Compound (Total Concentration)

The content of the specified aromatic compound (total concentration) in the process oil of the present embodiment is 10 mass ppm or less. Here, the specified aromatic compound refers to the following eight types of substances: a benzo(a)anthracene; a chrysene and a triphenylene; a benzo(b)fluoranthene; a benzo(k)fluoranthene; a benzo(j)fluoranthene; a benzo(e)pyrene; a benzo(a)pyrene; and a dibenzo(a,h)anthracene. Although any of the above specified aromatic compounds is highly carcinogenic substance, since the content (total concentration) thereof is set to be 10 mass ppm or less, there is no need to concern about its carcinogenicity, thereby providing the process oil that is excellent in safety. Incidentally, the concentration was measured by the following method.

(Measuring Method of Concentration of Specified Aromatic Compound)

1 g of a sample is dissolved into a hexane in a 50 ml flask to prepare a sample solution of 2 mass %. 1 ml of the sample solution is added to 5 g of a hydrous silica gel of 5 mass %, which is rinsed with 20 ml of a hexane. Then, an object substance having adsorbed is eluted using 50 ml of a hexane solution containing 5 vol % of an acetone. After concentrating the eluate to 1 ml, 1 µg of a chrysene $d_{12}$ or a benzo(a)pyrene $d_{12}$ is added as an internal standard material, which is then analyzed by a gas chromatograph.

(n) Content of Polar Substance:

The polar substance content in the process oil of the present embodiment should be 10 to 30 mass %, preferably 12 to 20 mass %, and more preferably 12 to 15 mass %. When the polar substance content is less than 10 mass %, the compatibility with the rubber material is degraded. On the other hand, when the polar substance content exceeds 30 mass %, the PCA content increases and possibly exceeds 3 mass % as the regulation value, and the specified aromatic compound content might exceed 10 mass ppm.

Incidentally, the polar substance content in the process oil may be measured in compliance with ASTM D2007.

An example of a procedure to manufacture the above-described process oil of the present embodiment will be described below in detail.

[Manufacturing of Deasphalted Oil (Deasphalting Step)]

In the deasphalting step, the vacuum residual oil obtained by performing the atmospheric distillation and the vacuum distillation on the crude oil is deasphalted to obtain the deasphalted oil.

Here, in order to perform the atmospheric distillation on the crude oil, a conventional atmospheric distillation device and a conventional distillation condition can be used. Specifically, for instance, the crude oil such as a paraffinic crude oil or a naphthenic crude oil, which is an object to be refined, is heated to about 350° C. in a heating furnace or the like and sent out to an atmospheric distillation column, which is then turned to be a petroleum vapor in the atmospheric distillation column. After cooling, the petroleum vapor is sequentially fractionated into components in the ascending order of boiling point. Since the vacuum residual oil is obtained by the atmospheric distillation and the vacuum distillation in the present embodiment, it may be so arranged to obtain an atmospheric residual oil having boiling point of 350° C. or higher.

Next, further distillation (vacuum distillation) under reduced pressure is performed on the obtained atmospheric residual oil. The vacuum distillation may be performed using a conventional vacuum distillation device and a conventional operating condition, and the vacuum distillation fractionates the atmospheric residual oil into fractions such as a vacuum naphtha, a vacuum light gas oil and a vacuum residual oil, from which the vacuum residual oil is obtained.

Then, the vacuum residual oil is separated into an oil component (deasphalted oil) and an asphalt component using a solvent such as a liquefied propane (or a mixed solvent of the liquefied propane and a butane). Deasphalting using the liquefied propane is performed by, for instance, adding the liquefied propane to the vacuum residual oil by an amount of 4.5 to 6 times as large volume as that of the vacuum residual oil and setting extraction temperature to 85 to 100° C. (column top)/60 to 75° C. (column bottom) to extract the deasphalted oil.

Here, the yield of the deasphalted oil obtained in the deasphalting step is 30 to 40 vol % of the vacuum residual oil. The viscosity at 100° C. of the obtained deasphalted oil is preferably 30 to 50 $mm^2/s$, and more preferably 30 to 45 $mm^2/s$.

By the above-described step, the deasphalted oil having the properties of (a), (l) and (m) below can be manufactured:
(a) a polycyclic aromatics (PCA) content of less than 3 mass %;
(l) a benzo(a)pyrene content of 1 mass ppm or less; and
(m) a specified aromatic compound content of 10 mass ppm or less.

[Manufacturing of Extract (Solvent-Extraction Step)]

In the solvent-extraction step, the deasphalted oil obtained in the above-described deasphalting step is solvent-extracted using the polar solvent to obtain the extract. By solvent-extracting the deasphalted oil to obtain the extract, the PCA content of the process oil can be easily maintained to be less than 3 mass %, and the aniline point can be appropriately adjusted, which results in preventing generation of the bleeding.

Here, examples of available polar solvents may include a furfural, a N-methyl-2-pyrrolidone (NMP), a phenol, a cresol, a sulfolane, a dimethylsulfoxide, a formylmorpholine and the like, especially the furfural and the N-methyl-2-pyrrolidone (NMP) may be preferable for use.

In the solvent-extraction step, the solvent ratio (volume ratio of solvent/dewaxed oil or deasphalted oil) is preferably 2.0 to 15.0, and more preferably 5.0 to 10.0. In this case, the extraction temperature is preferably 80 to 150° C., and more preferably 90 to 130° C. By performing the solvent-extraction under the condition above, the extract with the PCA content of less than 3 mass % can be efficiently obtained.

The yield of the extract obtained in the solvent-extraction step should be 50 mass % or higher of the deasphalted oil, and preferably 60 mass % or higher. As long as the yield of the extract is 50 mass % or higher of the deasphalted oil, the process oil with the content of the PCA being less than 3 mass % can be properly obtained.

Incidentally, in order to obtain the extract with the yield of 50 mass % or higher of the deasphalted oil, for instance, when the furfural is used as the solvent, the solvent ratio may be around 10 to 12 and the extraction temperature may be around 120 to 150° C., whereas, when the NMP is used as the solvent, the solvent ratio may be around 5 to 8 and the extraction temperature may be around 100 to 120° C.

By the above-described step, the extract having the properties of (l) and (m) below can be obtained:
(l) a benzo(a)pyrene content of 1 mass ppm or less; and
(m) a specified aromatic compound content of 10 mass ppm or less.

[Mixing of Extract and Lubricant Base Oil (Mixing Step)]

A manufacturing method of the lubricant base oil to be mixed with the extract is not particularly limited. The lubricant oil only have to meet the requirement of the PCA content being less than 3 mass %, and preferably, the lubricant oil may have, in addition to the above-described properties of (l) and (m), the following properties of (p) to (r):
(p) a viscosity (100° C.) of 5 to 40 $mm^2/s$;
(q) an aniline point of 75 to 120° C.; and
(r) a flash point of 200° C. or higher.

Such lubricant base oil can be obtained by performing the atmospheric distillation on a paraffinic crude oil, an intermediate base oil or a naphthenic crude oil, or by refining by conventional methods a distillate obtained by performing vacuum distillation on a residual oil of an atmospheric distillation or a deasphalted oil obtained by deasphalting the residual oil. For instance, a solvent-refined oil, hydrorefined oil may be exemplified as the lubricant base oil. By adjusting purification conditions of such purification methods, the lubricant base oil having the above-described properties can be obtained. Note that the refined oil may be appropriately subjected to deasphalting or clay treatment.

Then, the mixed oil obtained by a simple operation of mixing the extract and the lubricant base oil can be provided as it is as the process oil.

Mixing volume ratio of the extract and the lubricant base oil is 95/5 to 60/40, preferably 80/20 to 60/40. By setting the mixing volume ratio of the extract and the lubricant base oil to 95/5 to 60/40, the process oil having the properties of (a) and (i) to (n) can be provided efficiently.

Now, the manufacturing method of the process oil of the present embodiment will be described referring to the flowchart in FIG. 3. First, the atmospheric distillation is performed on the crude oil to obtain the atmospheric residual oil and the vacuum distillation is performed on the atmospheric residual oil to obtain the vacuum residual oil ($S_1$, $S_{21}$, $S_{22}$ and $S_2$). Then, the obtained vacuum residual oil is deasphalted in the deasphalting step to obtain the deasphalted oil ($S_{31}$, $S_3$). The obtained deasphalted oil is then solvent-extracted in the solvent-extraction step to obtain the extract ($S_{51}$, $S_5$).

Then, the obtained extract is mixed with the lubricant base oil with the polycyclic aromatics (PCA) content of less than 3 mass % ($S_{61}$, $S_6$), and the obtained mixed oil can be provided as the process oil ($S_7$).

Advantage of Second Embodiment

Since the process oil obtained in the second embodiment described above has the properties of (a) and (i) to (n), the process oil exhibits various performances that the conventional process oil has required, such as processability and anti-bleeding performance of the rubber. In addition, since the content of the PCA that is hazardous to human bodies is controlled to be less than 3 mass % and the contents of the benzo(a)pyrene and the specified aromatic compound are respectively controlled to be 1 mass ppm or less and 10 mass ppm or less, the process oil is not carcinogenic and thus excellent in safety.

In manufacturing conventional oils substituting the aromatic oil for tires, since two-stage extraction or facility (step) for further performing hydrotreatment on the extract has been required in order to obtain such process oil, yield decreased in each treatment. In contrast, the present embodiment requires only a simple method for mixing the extract and the lubricant base oil, which is further superior manufacturing method of the process oil as compared to the conventional method.

Addition of the process oil to the natural rubber or the synthetic rubber can properly provide various types of rubber compositions, and the obtained rubber compositions can be used for various rubber products such as tires.

Further, the process oil can also be used as a plasticizer for the thermoplastic resin, a constituent of a printing ink and a softener for a modified asphalt used in paving.

When a rubber (rubber composition) is manufactured using the process oil of the present embodiment, content of the process oil may be, for instance, 10 to 50 parts by weight, and preferably 20 to 40 parts by weight relative to 100 parts by weight of a rubber component.

Also, in order to manufacture the rubber composition, reinforcers such as a carbon black and a silica, a vulcanizing agent, a vulcanization accelerator, a filler, an anti-oxidant such as waxes, a softener other than the process oil of the present embodiment, a plasticizer, etc., which are generally used in rubber industry, may appropriately be added in addition to the process oil of the embodiment and the rubber component.

Modification of Embodiments

Incidentally, the embodiment described above is only an embodiment illustrating the present invention, and the present invention is not limited to the embodiment but includes modifications and improvements as long as the objects and the advantages of the present invention can be achieved. Specific structure and shape of the components in implementing the present invention may be designed in any manner as long as the objects and the advantages of the present invention can be achieved.

For example, although the manufacturing method shown in FIG. 1 is exemplified as the manufacturing method of the process oil of the present invention having the properties of (a) to (f) in the first embodiment, and the manufacturing method shown in FIG. 3 is exemplified as the manufacturing method of the process oil of the present invention having the properties of (a) and (i) to (n) in the second embodiment, manufacturing method for obtaining the process oil may be appropriately adjusted as long as the process oil has the properties of (a) to (f) in the first embodiment or the properties of (a) and (i) to (n) in the second embodiment.

EXAMPLE

Now, the first embodiment of the present invention will be described in more detail with examples and comparisons, the description of which by no means limits the present invention.

Example 1

(Deasphalting Step)
A vacuum residual oil obtained by performing the atmospheric distillation on a middle-east crude oil and further performing the vacuum distillation is deasphalted using a propane as a solvent to obtain a deasphalted oil A. Yield of the deasphalted oil A was 38 mass % of the vacuum residual oil, and the viscosity at 100° C. of the deasphalted oil A was 37.6 $mm^2/s$.
(Dewaxing Step)
The deasphalted oil A was solvent-dewaxed using a mixed solvent of a methyl ethyl ketone and a toluene (mixing ratio: methyl ethyl ketone/toluene=40/60) to obtain a dewaxed oil A having pour point of 12.5° C. Yield of the dewaxed oil A was 93 mass % of the deasphalted oil.
(Solvent-Extraction Step)
Then, the dewaxed oil A was solvent-extracted using a furfural as a solvent to obtain an extract A with a yield of 62 mass % of the deasphalted oil. Here, solvent ratio was 10 and extraction temperature was 145° C. The extract A was provided as a process oil of Example 1 of the first embodiment of the present invention.

Example 2

(Deasphalting Step)
As in Example 1, the vacuum residual oil obtained by performing the atmospheric distillation on the middle-east crude oil and further performing the vacuum distillation is deasphalted using the propane as a solvent to obtain the deasphalted oil A.
(Dewaxing Step)
The deasphalted oil A was dewaxed using Ni-ZSM5 catalyst under the following conditions: pressure=3 MPa; LHSV=0.5/hour; hydrogen/oil ratio=450 $Nm^3$; and dewaxing temperature=335° C. so that a dewaxed oil B having pour point of 20.0° C. was obtained. Yield of the dewaxed oil B was 94 mass % of the deasphalted oil.
(Solvent-Extraction Step)
Then, the dewaxed oil B was solvent-extracted using a N-methyl-2-pyrrolidone (NMP) as a solvent to obtain an extract B with a yield of 64 mass % of the deasphalted oil. Here, the solvent ratio was 7 and the extraction temperature was 110° C. The extract B was provided as a process oil of Example 2 of the first embodiment of the present invention.

Example 3

The dewaxed oil B obtained in Example 2 was solvent-extracted using the NMP as a solvent to obtain an extract D with a yield of 48 mass % of the deasphalted oil. Here, solvent ratio was 5 and extraction temperature was 95° C. The extract D and the dewaxed oil B obtained in Example 2 were mixed with mixing ratio of extract D/dewaxed oil B=50/50 to obtain a process oil of Example 3 of the first embodiment of the present invention.

Example 4

The dewaxed oil B obtained in Example 2 was solvent-extracted using the NMP as a solvent to obtain the extract D with a yield of 48 mass % of the deasphalted oil. Here, the solvent ratio was 5 and the extraction temperature was 95° C. The extract D and a commercially-available mineral oil X with the polycyclic aromatics (PCA) content of 1.8 mass % were mixed with mixing ratio of extract D/mineral oil X=50/50 to obtain a process oil of Example 4 of the first embodiment of the present invention.

Example 5

The deasphalted oil A obtained in Example 1 was solvent-extracted using the furfural as a solvent to obtain an extract X with a yield of 53% of the deasphalted oil. Here, the solvent ratio was 5 and the extraction temperature was 125° C. The extract X was provided as a process oil of Example 5 of the first embodiment of the present invention.

Example 6

An extract E obtained in later-described Comparison 6 and the deasphalted oil A obtained in Example 1 (which is also a process oil of later-described Comparison 3) were mixed with mixing ratio of extract E/deasphalted oil A=50/50 to obtain a process oil of Example 6 of the first embodiment of the present invention.

[Comparison 1]
The dewaxed oil A obtained in Example 1 was solvent-extracted using the furfural as a solvent to obtain an extract C with a yield of 49 mass % of the deasphalted oil. Here, the solvent ratio was 8 and the extraction temperature was 110° C. The extract C was provided as a process oil of Comparison 1.

[Comparison 2]
As in Example 3, the dewaxed oil B obtained in Example 2 was solvent-extracted using the NMP as a solvent to obtain the extract D with a yield of 48 mass % of the deasphalted oil.

Here, the solvent ratio was 5 and the extraction temperature was 95° C. The extract D was provided as a process oil of Comparison 2.

[Comparison 3]

The deasphalted oil A of Example 1 was provided as a process oil of Comparison 3.

[Comparison 4]

The dewaxed oil A of Example 1 was provided as a process oil of Comparison 4.

[Comparison 5]

The dewaxed oil B of Example 2 was provided as a process oil of Comparison 5.

[Comparison 6]

The deasphalted oil A obtained in Example 1 was solvent-extracted using the furfural as a solvent to obtain the extract E with a yield of 40% of the deasphalted oil. Here, the solvent ratio was 5 and the extraction temperature was 125° C. The extract E was provided as a process oil of Comparison 6.

Properties of the process oils of Examples 1 to 6 are shown in Tables 1 and 2 with properties of a conventional aromatic oil as reference. Also, properties of the process oils of Comparisons 1 to 6 are shown in Tables 3 and 4 with the properties of the conventional aromatic oil as reference. Here, standards or the like for evaluation are in compliance with those described above.

(Properties of Process Oils: Examples)

TABLE 1

|  |  | Reference Aromatic oil | Example 1 Extract A | Example 2 Extract B | Example 3 Mixed oil (*1) |
|---|---|---|---|---|---|
| Deasphalting step | Yield (%) | — | 38.0 | 38.0 | 38.0 |
|  | 100° C. viscosity (mm²/s) | — | 37.6 | 37.6 | 37.6 |
| Dewaxing step | method | — | solvent | hydrogenation | hydrogenation |
|  | Pour point (° C.) | — | 12.5 | 20.0 | 20.0 |
|  | Yield (%) | — | 93 | 94 | 94 |
| Solvent-extraction step | Solvent | — | Furfural | NMP | NMP |
|  | Solvent ratio | — | 10 | 5 | 5 |
|  | Extraction temperature (° C.) | — | 145 | 110 | 95 |
|  | Yield (%) (note) | — | 62 | 64 | 48 |
| PCA (mass %) |  | >3 | 2.9 | 2.6 | 2.7 |
| 100° C. viscosity (mm²/s) |  | 24.36 | 50.04 | 40.58 | 45.45 |
| Aniline point (° C.) |  | 29.2 | 86.4 | 92.0 | 94.0 |
| Pour point (° C.) |  | 7.5 | 10.0 | 17.5 | 17.5 |
| Aromatic hydrocarbon (mass %) |  | 81.2 | 52.5 | 47.2 | 45.5 |
| Polar substance (mass %) |  | 9.7 | 14.5 | 14.0 | 13.4 |
| % $C_A$ (ASTM D3238) |  | 47.2 | 24.8 | 22.1 | 21.2 |
| Flash point (° C.) |  | 258 | 270 | 256 | 260 |
| ASTM color phase |  | 8.0 | 6.5 | 6.0 | 5.0 |

(note)
Yield in relation to deasphalted oil
(*1) Mixed oil obtained by mixing extract D and dewaxed oil B by 50/50

TABLE 2

|  |  | Example 4 Mixed oil (*2) | Example 5 Extract X | Example 6 Mixed oil (*3) |
|---|---|---|---|---|
| Deasphalting step | Yield (%) | 38.0 | 38.0 | 38.0 |
|  | 100° C. viscosity (mm²/s) | 37.6 | 37.6 | 37.6 |
| Dewaxing step | method | hydrogenation | Not performed | Not performed |
|  | Pour point (° C.) | 20.0 | — | — |
|  | Yield (%) | 94 | — | — |
| Solvent-extraction step | Solvent | NMP | Furfural | Furfural |
|  | Solvent ratio | 5 | 10 | 5 |
|  | Extraction temperature (° C.) | 95 | 125 | 125 |
|  | Yield (%) (note) | 48 | 53 | 40 |
| PCA (mass %) |  | 2.8 | 2.9 | 2.9 |
| 100° C. viscosity (mm²/s) |  | 30.24 | 69.31 | 56.50 |
| Aniline point (° C.) |  | 85.2 | 87.4 | 95.0 |
| Pour point (° C.) |  | 10.0 | 3.5 | 37.5 |
| Aromatic hydrocarbon (mass %) |  | 2.8 | 55.9 | 45.0 |
| Polar substance (mass %) |  | 13.6 | 17.4 | 12.9 |
| % $C_A$ (ASTM D3238) |  | 23.6 | — | — |
| Flash point (° C.) |  | 252 | 280 | 270 |
| ASTM color phase |  | 4.5 | 6.8 | 5.5 |

(note)
Yield in relation to deasphalted oil
(*2) Mixed oil obtained by mixing extract D and mineral oil with PCA content of 1.8 mass % by 50/50
(*3) Mixed oil obtained by mixing extract E (Comparison 6) and deasphalted oil A by 50/50

(Properties of Process Oils: Comparisons)

TABLE 3

|  |  | Reference Aromatic oil | Comparison 1 Extract C | Comparison 2 Extract D | Comparison 3 Deasphalted oil A |
|---|---|---|---|---|---|
| Deasphalting step | Yield (%) | — | 38.0 | 38.0 | 38.0 |
|  | 100° C. viscosity (mm$^2$/s) | — | 37.6 | 37.6 | 37.6 |
| Dewaxing step | method | — | Solvent | Hydrogenation | Not performed |
|  | Pour point (° C.) | — | 12.5 | 20.0 | — |
|  | Yield (%) | — | 93 | 94 | — |
| Solvent-extraction step | Solvent | — | Furfural | NMP | — |
|  | Solvent ratio | — | 10 | 5 | — |
|  | Extraction temperature (° C.) | — | 125 | 95 | — |
|  | Yield (%) (note) | — | 49 | 48 | — |
| PCA (mass %) |  | >3 | 3.4 | 3.8 | 2.0 |
| 100° C. viscosity (mm$^2$/s) |  | 24.36 | 69.33 | 53.56 | 38.00 |
| Aniline point (° C.) |  | 29.2 | 84.3 | 83.3 | 108.0 |
| Pour point (° C.) |  | 7.5 | 7.5 | 15.0 | >50 |
| Aromatic hydrocarbon (mass %) |  | 81.2 | 54.9 | 71.5 | 33.2 |
| Polar substance (mass %) |  | 9.7 | 19.3 | 17.2 | 9.7 |
| % C$_A$ (ASTM D3238) |  | 47.2 | 24.4 | 27.0 | — |
| Flash point (° C.) |  | 258 | 282 | 276 | 254 |
| ASTM color phase |  | 8.0 | 7.0 | 6.0 | 3.0 |

(note)
Yield in relation to deasphalted oil

TABLE 4

|  |  | Comparison 4 Dewaxed oil A | Comparison 5 Dewaxed oil B | Comparison 6 Extract E |
|---|---|---|---|---|
| Deasphalting step | Yield (%) | 38.0 | 38.0 | 38.0 |
|  | 100° C. viscosity (mm$^2$/s) | 37.6 | 37.6 | 37.6 |
| Dewaxing step | method | Solvent | Hydrogenation | Not performed |
|  | Pour point (° C.) | 12.5 | 20.0 | — |
|  | Yield (%) | 93 | 94 | — |
| Solvent-extraction step | Solvent | Not performed | Not performed | Furfural |
|  | Solvent ratio | — | — | 5 |
|  | Extraction temperature (° C.) | — | — | 125 |
|  | Yield (%) (note) | — | — | 40 |
| PCA (mass %) |  | 2.3 | 2.1 | 4.0 |
| 100° C. viscosity (mm$^2$/s) |  | 41.18 | 32.49 | 71.5 |
| Aniline point (° C.) |  | 102.3 | 105.3 | 82.0 |
| Pour point (° C.) |  | 12.5 | 20.0 | 5.0 |
| Aromatic hydrocarbon (mass %) |  | 38.0 | 38.9 | 57.0 |
| Polar substance (mass %) |  | 9.2 | 8.2 | 16.0 |
| % C$_A$ (ASTM D3238) |  | 17.2 | 15.9 | — |
| Flash point (° C.) |  | 256 | 254 | 286 |
| ASTM color phase |  | 3.5 | 3.5 | 7.0 |

(note)
Yield in relation to deasphalted oil

Test Example 1

Using the process oils obtained in Examples 1 to 6 and Comparisons 1 to 6 described above, a high styrene rubber and a general-purpose styrene rubber were manufactured with formulations of Tables 5 and 6.

(Formulation of High Styrene Rubber)

TABLE 5

| Constituent material | Compounding ratio (parts by weight) |
| --- | --- |
| High styrene rubber (note 1) | 50 |
| General-purpose styrene rubber (note 2) | 50 |
| Carbon | 50 |
| Zinc No. 3 | 3 |
| Stearic acid | 2 |
| Sulfur | 2 |
| Vulcanization accelerator (CZ) | 1 |
| Process oil | 40 |

(note 1)
ZEON CORPORATION Nipol 1500
(note 2)
ZEON CORPORATION Nipol 9500

(Formulation of General-Purpose Rubber)

TABLE 6

| Constituent material | Compounding ratio (parts by weight) |
| --- | --- |
| General-purpose styrene rubber (note 2) | 100 |
| Carbon | 50 |
| Zinc No. 3 | 3 |
| Stearic acid | 2 |
| Sulfur | 2 |
| Vulcanization accelerator | 1 |
| Process oil | 40 |

(note 2)
ZEON CORPORATION Nipol 9500

For the obtained high styrene rubbers, generation of bleeding (a phenomenon in which an oil bleeds on a surface of a rubber) and separation of a wax component were visually observed. For the obtained general-purpose styrene rubbers, rubber properties such as elongation, hardness, tensile strength and M 300 (elasticity of a rubber when the rubber is elongated at elongation percentage of 300%) were measured in compliance with JIS K6301. Based on the visual observation and measurement, the high styrene rubbers and general-purpose rubbers were compared and evaluated. The results are shown in Tables 7 and 8.

Note that measurement values of the rubber properties of the general-purpose styrene rubbers were compared with those of a general-purpose styrene rubber manufactured using the conventional aromatic oil as the reference (refer to Tables 1 and 3 for its properties). The evaluations were made using relative values with the measurement values of the aromatic oil being 100.

(Result)

TABLE 7

| Rubber type | Evaluation items | reference | Example 1 | Example 2 | Example 3 | Example 4 | Example 5 | Example 6 |
| --- | --- | --- | --- | --- | --- | --- | --- | --- |
| High styrene rubber | Bleeding | Not observed | Not observed | Not observed | Not observed | Not observed | Not observed | Not observed |
| | Wax separation | Not observed | Not observed | Not observed | Not observed | Not observed | Not observed | Not observed |
| General-purpose styrene rubber | Elongation | 100 | 106 | 105 | 105 | 98 | 102 | 106 |
| | Hardness | 100 | 100 | 100 | 100 | 100 | 100 | 100 |
| | Tensile strength | 100 | 96 | 95 | 97 | 95 | 96 | 96 |
| | M300 | 100 | 94 | 92 | 93 | 91 | 93 | 94 |

TABLE 8

| Rubber type | Evaluation items | Comparison 1 | Comparison 2 | Comparison 3 | Comparison 4 | Comparison 5 | Comparison 6 |
| --- | --- | --- | --- | --- | --- | --- | --- |
| High styrene rubber | Bleeding | Not observed | Not observed | Observed | Observed | Observed | Not observed |
| | Wax separation | Not observed | Not observed | Observed | Not observed | Not observed | Not observed |
| General-purpose styrene rubber | Elongation | 108 | 102 | — | — | — | 106 |
| | Hardness | 100 | 100 | — | — | — | 100 |
| | Tensile strength | 95 | 92 | — | — | — | 94 |
| | M300 | 91 | 91 | — | — | — | 95 |

(Note)
In Comparisons 3, 4 and 5, since bleedings were observed with the high styrene rubbers, the rubber properties of the general-purpose styrene rubbers were not measured.

As is clear from results in table 7, the high styrene rubbers using the process oils of Examples 1 to 6 were free from generation of the bleeding and separation of the wax component, so that they were verified to be high styrene rubbers having no problem in use.

Especially, in Examples 4 and 6, even though the yields of the extracts used were less than 50 mass % of the deasphalted oils, the process oils having the properties of (b) to (f) could be made by mixing the extracts with the mineral oils or the asphalted oils by the mixing ratio of 50/50, and the evaluation results also showed no problem.

In addition, the rubber properties of the general-purpose styrene rubbers using the process oils of Examples 1 to 6 did not show a big difference from that using the conventional aromatic process oil, so that they were verified to have rubber properties equal to those of conventional process oils.

On the other hand, as is clear from the results in Table 8, since the process oil of Comparison 3 had high aniline point and pour point, bleeding and separation of the wax component were observed.

Since the process oils of Comparisons 4 and 5 had high aniline point, bleeding was observed.

As for the process oils of Comparisons 1, 2 and 6, the high styrene rubbers thereof showed no bleeding and separation of the wax component, and the general-purpose styrene rubbers thereof showed no problem in their rubber properties. However, since yields of the extracts in manufacturing were low, the contents of the aromatic hydrocarbons and the polar substances in the process oils became large, which caused the PCA content to exceed 3 mass %, so that the process oils had problems in carcinogenicity and safety.

Next, the second embodiment of the present invention will be described in more detail with examples and comparisons, the description of which by no means limits the present invention.

Example 7

(Deasphalting Step)

By performing the atmospheric distillation on a middle-east crude oil to extract a fuel oil such as a kerosene and a light gas oil and further performing the vacuum distillation on an atmospheric residual oil outlet from a distillation column bottom to obtain a vacuum light gas oil. A vacuum residual oil obtained after fractionating the vacuum light gas oil was used as a raw material to be deasphalted. The vacuum residual oil was deasphalted using a propane as a solvent with solvent ratio of 5.5 and at predetermined extraction temperature (column top: 90° C., column bottom: 65° C.) to obtain a deasphalted oil B with a yield of 35 vol % of the vacuum residual oil. The properties are shown in Table 9.

(Solvent-Extraction Step)

The deasphalted oil obtained in the deasphalting step was extracted using the N-methyl-2-pyrrolidone (NMP) as a solvent with solvent ratio of 3.0 and at extraction temperature of 120° C. to obtain an extract E1. The properties are shown in Table 9.

(Mixing Step)

The extract E1 was mixed with 10 vol % of a lubricant base oil B1 having properties shown in Table 10 to obtain a mixed oil having viscosity at 100° C. being 60 mm$^2$/s (volume mixing ratio: 90/10). The mixed oil was provided as a process oil of Example 7 of the second embodiment of the present invention.

Example 8

The extract E1 obtained in Example 7 was mixed with 30 vol % of a lubricant base oil B2 having properties shown in Table 10 to obtain a mixed oil having viscosity at 100° C. being 60 mm$^2$/s (volume mixing ratio: 70/30). The mixed oil was provided as a process oil of Example 8 of the second embodiment of the present invention.

Example 9

The extract E1 obtained in Example 7 was mixed with 7 vol % of a lubricant base oil B3 having properties shown in Table 10 to obtain a mixed oil having viscosity at 100° C. being 60 mm$^2$/s (volume mixing ratio: 93/7). The mixed oil was provided as a process oil of Example 9 of the second embodiment of the present invention.

[Comparison 7]

The vacuum residual oil obtained in Example 7 was deasphalted with solvent ratio of 7.0 and at predetermined extraction temperature (column top: 75° C., column bottom: 60° C.) to obtain a deasphalted oil C with a yield of 60 vol % of the vacuum residual oil. The deasphalted oil C was solvent-extracted under the extraction condition similar to Example 7 to obtain an extract E2 having properties shown in Table 9. The extract E2 was mixed with 15 vol % of the lubricant base oil B1 to obtain a mixed oil having viscosity at 100° C. being 60 mm$^2$/s (volume mixing ratio: 85/15). The obtained mixed oil was provided as a process oil of Comparison 7.

[Comparison 8]

The extract E2 was mixed with 80 vol % of the lubricant base oil B1 to obtain a mixed oil (volume mixing ratio: 20/80). The obtained mixed oil was provided as a process oil of Comparison 8.

[Comparison 9]

The extract E2 was mixed with 35 vol % of the lubricant base oil B2 to obtain a mixed oil (volume mixing ratio: 65/35). The obtained mixed oil was provided as a process oil of Comparison 9.

[Comparison 10]

The extract E2 was mixed with 80 vol % of the lubricant base oil B2 to obtain a mixed oil (volume mixing ratio: 20/80). The obtained mixed oil was provided as a process oil of Comparison 10.

Properties of the process oils of Examples 7 to 9 are shown in Table 11 with the properties of the conventional aromatic oil as reference. Also, properties of the process oils of Comparisons 7 to 10 are shown in table 12. Here, standards or the like for evaluation are in compliance with those described above.

TABLE 9

|  |  | Deasphalted oil B | Deasphalted oil C | Extract E1 | Extract E2 |
|---|---|---|---|---|---|
| Manufacturing condition | Solvent ratio | 4.0 | 7.0 | 3.0 | 1.0 |
|  | Column top temp. (° C.) | 95 | 75 | 120 | 100 |
|  | Column bottom temp. (° C.) | 65 | 60 | 80 | 80 |
|  | Yield (vol %) | 35 | 60 | 30 | 15 |
|  | PCA (mass %) | 2.0 | 3.6 | — | — |
|  | 100° C. viscosity (mm$^2$/s) | 39.0 | 45.0 | 80.7 | 92.5 |
|  | Aniline point (° C.) | 106.8 | 95.2 | <61.2 | 49.5 |

TABLE 9-continued

|  | Deasphalted oil B | Deasphalted oil C | Extract E1 | Extract E2 |
|---|---|---|---|---|
| Flash point (° C.) | 298 | 294 | 326 | 321 |
| benzo(a)pyrene (mass ppm) | 1≥ | 2.8 | 1≥ | 4.2 |
| specified aromatic compound (mass ppm) | 10≥ | 31 | 10≥ | 45 |

TABLE 10

|  |  | Lubricant base oil B1 | Lubricant base oil B2 | Lubricant base oil B3 |
|---|---|---|---|---|
| Manufacturing condition | Solvent ratio | — | — | — |
|  | Column top temp. (° C.) | — | — | — |
|  | Column bottom temp. (° C.) | — | — | — |
|  | Yield (vol %) | — | — | — |
| PCA (mass %) |  | 1.8 | 1.3 | 2.1 |
| 100° C. viscosity (mm²/s) |  | 10.9 | 31.3 | 5.1 |
| Aniline point (° C.) |  | 107 | 119 | 97.1 |
| Flash point (° C.) |  | 270 | 320 | 220 |
| benzo(a)pyrene (mass ppm) |  | 1≥ | 1≥ | 1≥ |
| specified aromatic compound (mass ppm) |  | 10≥ | 10≥ | 10≥ |

TABLE 11

|  | Aromatic oil | Example 7 | Example 8 | Example 9 |
|---|---|---|---|---|
| Extract E1 (vol %) | — | 90 | 70 | 93 |
| Extract E2 (vol %) | — | — | — | — |
| Lubricant base oil B1 (vol %) | — | 10 | — | — |
| Lubricant base oil B2 (vol %) | — | — | 30 | — |
| Lubricant base oil B3 (vol %) | — | — | — | 7 |
| PCA (mass %) | >3 | 2.8 | 2.7 | 2.9 |
| 100° C. viscosity (mm²/s) | 24.5 | 62.7 | 59.4 | 60.6 |
| Aniline point (° C.) | 29.2 | 65.5 | 77.4 | 63.9 |
| Flash point (° C.) | 254 | 316 | 324 | 302 |
| benzo(a)pyrene (mass ppm) | ≥10 | 1≥ | 1≥ | 1≥ |
| specified aromatic compound (mass ppm) | ≥100 | 10≥ | 10≥ | 10≥ |
| Polar substance (mass %) | 9.7 | 15.6 | 13.1 | 16.5 |

TABLE 12

|  | Comparison 7 | Comparison 8 | Comparison 9 | Comparison 10 |
|---|---|---|---|---|
| Extract E1 (vol %) | — | — | — | — |
| Extract E2 (vol %) | 85 | 20 | 65 | 20 |
| Lubricant base oil B1 (vol %) | 15 | 80 | — | — |
| Lubricant base oil B2 (vol %) | — | — | 35 | 80 |
| Lubricant base oil B3 (vol %) | — | — | — | — |
| PCA (mass %) | 3.4 | 1.0 | 2.7 | 0.9 |
| 100° C. viscosity (mm²/s) | 62.5 | 15.3 | 61.9 | 37.1 |
| Aniline point (° C.) | 60.9 | 94.8 | 94.2 | 106.8 |
| Flash point (° C.) | 308 | 276 | 320 | 320 |
| benzo(a)pyrene (mass ppm) | 3.7 | 1≥ | 2.5 | 1≥ |
| specified aromatic compound (mass ppm) | 34 | 10≥ | 29 | 10≥ |
| Polar substance (mass %) | 21.7 | 9.0 | 17.7 | 8.2 |

Test Example 1

Using the process oils obtained in Examples 7 to 9 and Comparisons 7 to 10 described above, a high styrene rubber and a general-purpose styrene rubber were manufactured with the formulations of Tables 5 and 6 of the first embodiment.

For the obtained high styrene rubbers, generation of bleeding (a phenomenon in which an oil bleeds on a surface of a rubber) and separation of a wax component were visually observed. For the obtained general-purpose styrene rubbers, rubber properties such as elongation, hardness, tensile strength and M 300 (elasticity of a rubber when the rubber is elongated at elongation percentage of 300%) were measured in compliance with JIS K6301. Based on the visual observation and measurement, the high styrene rubbers and general-purpose rubbers were compared and evaluated. The results are shown in Tables 13 and 14.

Note that measurement values of the rubber properties of the general-purpose styrene rubbers were compared with those of a general-purpose styrene rubber manufactured using the conventional aromatic oil (refer to Table 11 for its properties). The evaluations were made using relative values with the measurement values of the aromatic oil being 100.

(Result)

TABLE 13

| Rubber type | Evaluation items | Aromatic oil | Example 7 | Example 8 | Example 9 |
| --- | --- | --- | --- | --- | --- |
| High styrene rubber | Bleeding | Not observed | Not observed | Not observed | Not observed |
|  | Wax separation | Not observed | Not observed | Not observed | Not observed |
| General-purpose styrene rubber | Elongation | 100 | 100 | 100 | 99 |
|  | Hardness | 100 | 100 | 100 | 100 |
|  | Tensile strength | 100 | 97 | 93 | 98 |
|  | M300 | 100 | 96 | 95 | 97 |

TABLE 14

| Rubber type | Evaluation items | Comparison 7 | Comparison 8 | Comparison 9 | Comparison 10 |
| --- | --- | --- | --- | --- | --- |
| High styrene rubber | Bleeding | Not observed | observed | observed | observed |
|  | Wax separation | Not observed | Not observed | Not observed | Not observed |
| General-purpose styrene rubber | Elongation | 100 | 85 | 88 | 78 |
|  | Hardness | 100 | 96 | 100 | 97 |
|  | Tensile strength | 98 | 92 | 84 | 76 |
|  | M300 | 97 | 78 | 76 | 74 |

As is clear from the results in table 13, the high styrene rubbers using the process oils of Examples 7 to 9 were free from generation of the bleeding and separation of the wax component, so that they were verified to be high styrene rubbers having no problem in use.

In addition, the rubber properties of the general-purpose styrene rubbers using the process oils of Examples 7 to 9 were not inferior to that using the conventional aromatic process oil, so that they were verified to have rubber properties equal to those of conventional process oils.

On the other hand, as is clear from the results in table 14, since the extracts used as the raw materials of the process oils of Comparisons 7 and 9 had high contents of specified aromatic compound and benzo(a)pyrene, the process oils obtained by mixing such extracts and the lubricant base oils also had problems in carcinogenicity and safety. Also, the viscosities at 100° C. of the process oils were low, so that the rubber properties thereof were inferior to the aromatic oil as reference.

As for the process oils of Comparisons 8 and 10, although the contents of the benzo(a)pyrene and the specified aromatic compound were satisfactory, the aniline points were high, and bleedings were observed in the high styrene rubbers. Especially, since the aniline point was quite high in Comparison 10, all of the elongation, tensile strength and M300 of the general-purpose styrene rubber were poor.

INDUSTRIAL APPLICABILITY

The process oil of the present invention can be used with advantage as a process oil and a flatting agent for a natural rubber or a synthetic rubber, and a plasticizer for a thermoplastic resin, a constituent of a printing ink and a softener for a modified asphalt used in paving.

The invention claimed is:

1. A process oil using as a raw material a deasphalted oil obtained by deasphalting a vacuum residual oil of a crude oil, the process oil comprising properties of:
    (a) a polycyclic aromatics (PCA) content of less than 3 mass %;
    (b) a kinematic viscosity (100° C.) of 40 to 70 mm$^2$/s;
    (c) an aniline point of 85 to 95° C.;
    (d) a flash point of 250° C. or higher;
    (e) an aromatic hydrocarbon content of 40 to 55 mass %; and
    (f) a polar substance content of 10 to 15 mass %.

2. The process oil according to claim 1, further comprising a property of:
    (g) a pour point of 40° C. or lower.

3. The process oil according to claim 1, wherein the process oil shows an ASTM color phase of 8.0 or lower when being diluted with a toluene of sixty times as large volume as the process oil.

4. A process oil obtained by mixing: an extract obtained by deasphalting and solvent-extracting a vacuum residual oil of a crude oil; and a lubricant base oil having a polycyclic aromatics (PCA) content of less than 3 mass %, the process oil comprising properties of:

(a) a polycyclic aromatics (PCA) content of less than 3 mass %;
(i) a kinematic viscosity (100° C.) of 30 to 80 mm²/s;
(j) an aniline point of 60 to 90° C.;
(k) a flash point of 240° C. or higher;
(l) a benzo(a)pyrene content of 1 mass ppm or less;
(m) a specified aromatic compound content of 10 mass ppm or lower; and
(n) a polar substance content of 10 to 30 mass %.

* * * * *